Dec. 10, 1957 A. A. LOBANOFF 2,815,796
TILTING SEAT BACK LOCK
Filed Aug. 5, 1953 3 Sheets-Sheet 1

INVENTOR
Arkady A. Lobanoff
BY
Paul Fitzpatrick
ATTORNEY

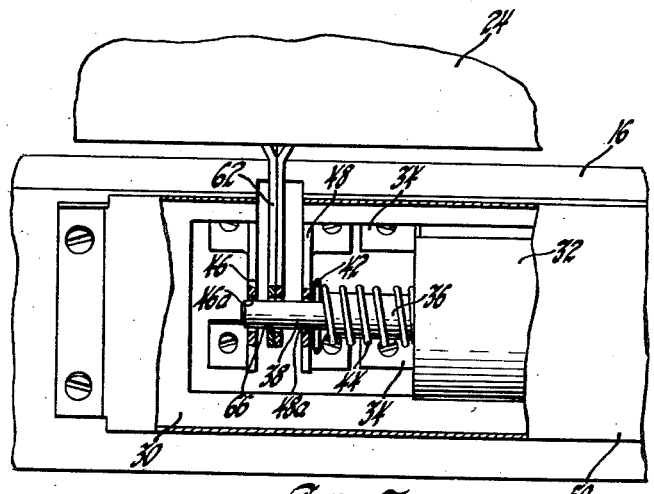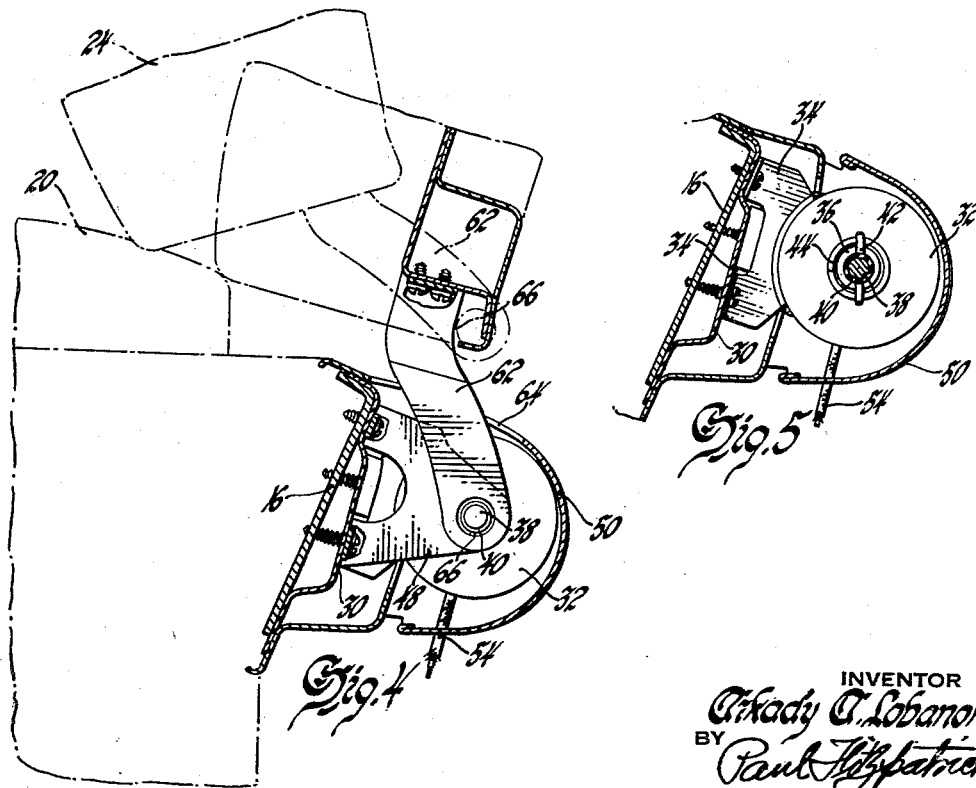

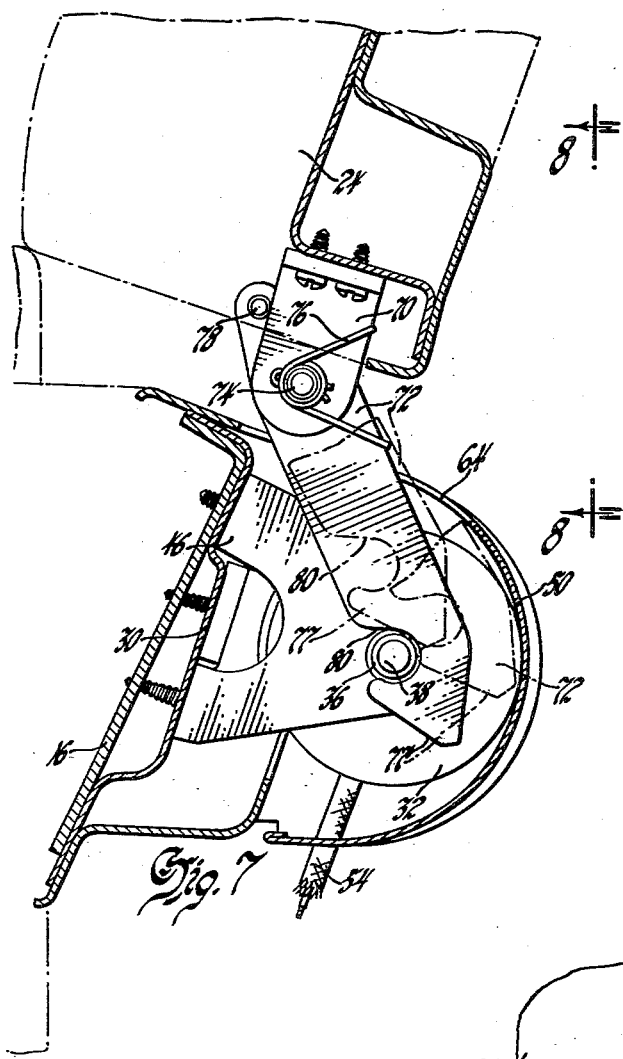
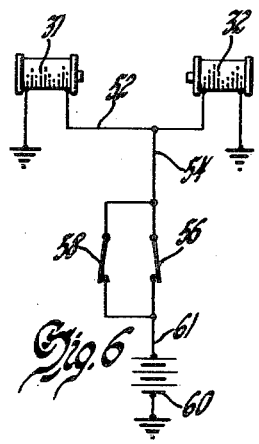
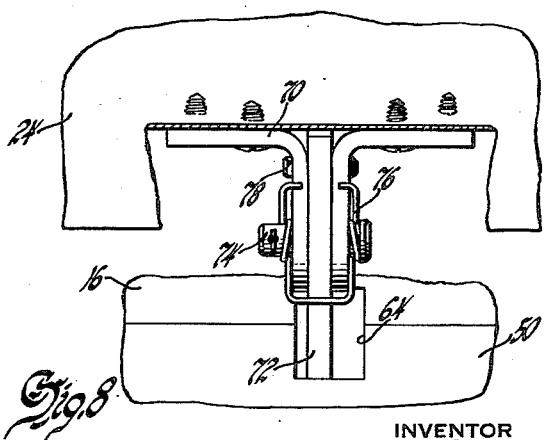

United States Patent Office 2,815,796
Patented Dec. 10, 1957

2,815,796

TILTING SEAT BACK LOCK

Arkady A. Lobanoff, Detroit, Mich., assignor to General Motors Corporation, Detroit, Mich., a corporation of Delaware Application August 5, 1953, Serial No. 372,437

4 Claims. (Cl. 155—152)

This invention relates to a latch, and more particularly to a latch for an automobile tilting seat back.

One feature of the invention is that it provides an improved latch; another feature of the invention is that it provides a solenoid-operated latch for locking the seat back in normal seating position, and door-operated switch means connected to the solenoid for controlling the operation thereof so that the seat back is automatically unlatched whenever the automobile door is opened; a further feature of the invention is that support means is provided for the bolt so that when the bolt is latched, the strain exerted on the bolt is taken up by the support means and not by the solenoid; yet another feature of the invention is that the bolt is covered with rubber or similar sound deadening material to provide for substantially noiseless operation and to prevent rattles; and still a further feature of the invention is that a pivoted catch member may be provided on the tilting seat back so that if the bolt is in latched position and the seat back is tilted forwardly, the seat back may be moved to its normal seating position, the pivoted catch member having a cam surface adapted to engage the bolt and cam the pivoted catch around the bolt into latching engagement with the bolt.

Other features and advantages of the invention will be apparent from the following description and from the drawings, in which:

Fig. 3 is a fragmentary view similar to a portion of Fig. 2, but with the parts in latched position;

Fig. 4 is a transverse section taken along the line 4—4 of Fig. 2, parts being shown in latched position in solid lines and in unlatched position in broken lines;

Fig. 5 is a transverse section taken along the line 5—5 of Fig. 2;

Fig. 6 is a schematic diagram of the wiring arrangement;

Fig. 7 is a view similar to Fig. 4, but showing a modified form of the invention, parts being shown in latched position in solid lines and in unlatched position in broken lines; and Fig. 8 is a view taken along the line 8—8 of Fig. 7.

A great many automobiles have only a single door on each side of the body, ingress to and egress from the rear seat of the automobile being facilitated by providing a tilting seat back hingedly mounted on the front seat frame of the automobile. In the event of a sudden stop, the inertia of the tilting seat back may tend to swing it forward, which would tend to push a passenger in the seat toward the windshield and dash panel at the front of the passenger compartment.

The invention provides a novel latching means comprising a solenoid-operated latch bolt on the seat frame adapted to cooperate with a catch member on the tilting seat back. When the solenoid is deenergized, the bolt is projected into latching engagement with the catch by means of a spring, and the solenoid, when energized, retracts the bolt to unlatch the seat. The solenoid is controlled by door-operated switches so that when both doors are closed, the seat is automatically latched, and when either door is opened, the seat is automatically unlatched to permit the seat to be tilted to facilitate access to the rear seat.

Figure 1:
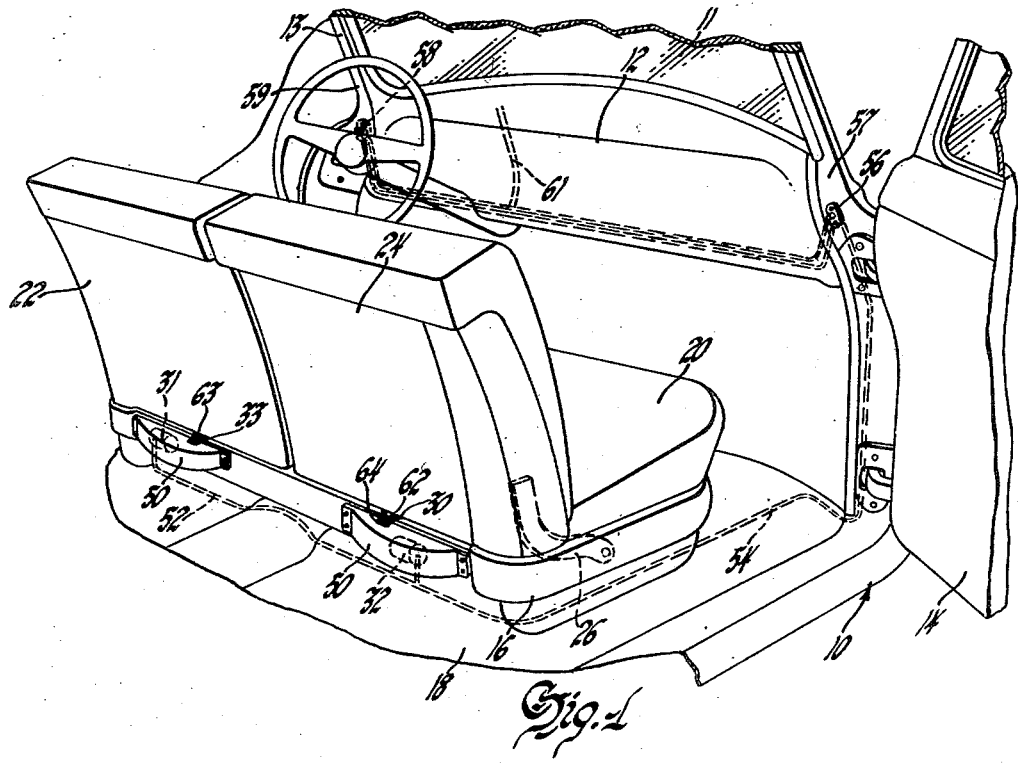
Fig. 1 is a fragmentary rear perspective view of the front seat and front passenger compartment of an automobile.
Figure 2:
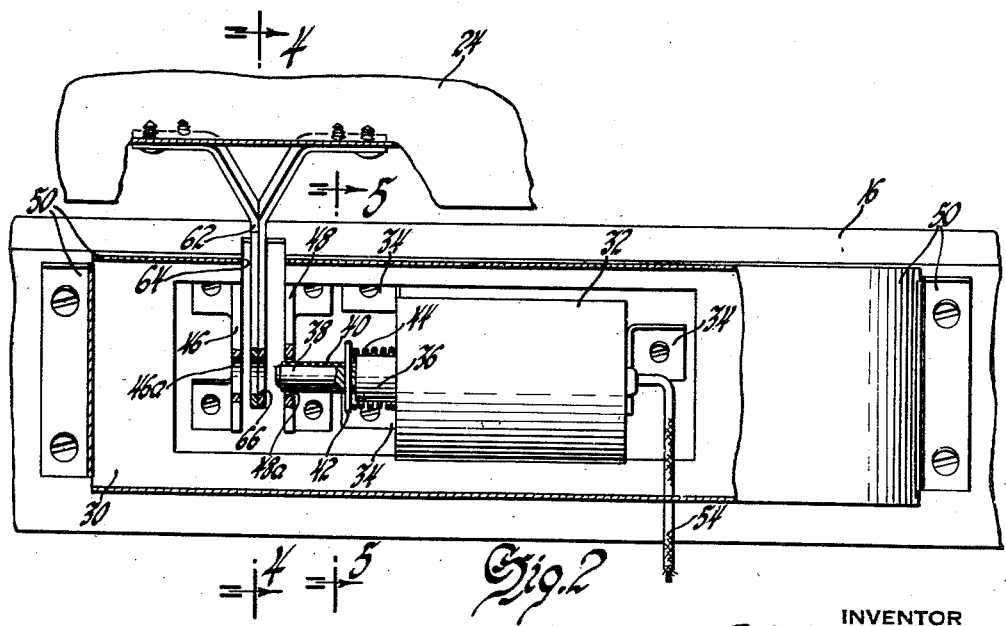
Fig. 2 is an enlarged rear elevational view of a portion of the seat showing the latch apparatus in unlatched position, portions being broken away to show underlying structure.

Referring now more particularly to the drawings, Fig. 1 shows an automobile body 10 having a windshield 11 mounted above a dash panel 12 at the front of the body. Access to the front or rear seat on the driver's side of the body may be had through a door 13, and access to the front or rear seat on the passenger's side of the body may be had through another door 14. The front seat of the automobile comprises a frame 16 which is mounted (preferably for fore and aft movement) on the floor 18 of the body, and which supports a front seat cushion 20. The back of the seat is divided into two portions 22 and 24, the portion 22 being on the driver's side and the portion 24 being on the passenger's side. Each of the portions 22 and 24 is hingedly mounted on the seat frame 16 in conventional manner so that either half of the seat back may be tilted forwardly to facilitate access to the rear seat compartment of the automobile. One of the hinges which mounts the tilting seat back portion 24 is shown at 26.

The latch device is shown generally in Fig. 1 and is shown in more detail in Figs. 2–5. While a separate latch device is shown for the driver's side of the body and for the passenger's side of the body, only one of these will be described in detail, the other being similar.

On the back of the seat frame 16 on the passenger's side a supporting plate 30 is mounted and a solenoid 32 is bolted to this plate by means of solenoid mounting brackets 34. On the driver's side a similar solenoid 31 is bolted to a plate 33, the solenoids 31 and 32 preferably being connected in parallel, as will be hereinafter described. The solenoid 32 is so mounted that its armature 36 projects horizontally and is extensible toward the center of the seat when the solenoid is deenergized and is retractable away from the center of the seat (into the core of the solenoid) when the solenoid is energized. A cylindrical latch bolt 38 projects from the free end of the armature 36, this bolt being formed with an outer layer of rubber 40 to provide for substantially silent operation and to prevent rattles. A pin 42 projects through the bolt and provides a shoulder for a compression spring 44, which surrounds the armature and urges the armature 36 and bolt 38 out of the core of the solenoid, or towards the center of the seat.

A pair of bolt support brackets 46 and 48 are bolted to the seat frame, these brackets respectively having apertures 46a and 48a aligned with and adapted to receive the bolt 38 when in latched position so that the strain exerted on the bolt when the seat is latched is taken up by the support brackets 46 and 48 and not by the solenoid 32.

As shown best in Fig. 1, the solenoid and bolt structure is concealed by a cover plate 50, which may be snapped onto the support plate 30.

The solenoid 31 on the driver's side of the car is connected in parallel with the solenoid 32 on the passenger's side by means of a lead 52, and both of the solenoids are connected by means of a lead 54 to a door-operated switch 56 mounted in a door pillar 57 in position to be operated by door 14. The switch 56 is connected in parallel with another door-operated switch 58 mounted in a door pillar 59 in position to be operated by door 13. Switches 56 and 58 are connected to the automobile battery 60 by a lead 61, as shown schematically in Fig. 6. The solenoids are grounded so that a one wire circuit can be used. The switches 56 and 58, which are connected in parallel, are so arranged that they are closed when the associated door is open and are open when the associated operating door is closed, so that when the doors are open, as shown in Fig. 1, both switches are closed and the solenoids are energized, retracting the armature and bolt to the position shown in Fig. 2.

Bolted to seat back portion 24 is a catch member 62, and a similar catch member 63 is bolted to seat back portion 22. When the seat back is in its normal seating position, as shown in Fig. 1, the catch member projects through an aperture 64 in the cover member 50 so that a latching opening 66 in the member 62 is aligned with the openings 46a and 48a in the support brackets and with the retractable bolt 38. With the parts in this position, if both doors 13 and 14 are closed so that both switches 56 and 58 are opened, the solenoid 32 will be deenergized, and the seat back will be latched, the spring 44 projecting the bolt 38 through the aligned apertures 46a and 48a in the support brackets and through the opening 66 in the catch 62. Fig. 3 shows the arrangement when the parts are latched. If either door is opened, one of the parallel connected switches 56 or 58 is again closed so that the solenoids 31 and 32 are energized and each latch is unlatched, the armature and bolt moving into the solenoid against the force of the spring 44. With this arrangement the seat is automatically latched whenever it is in its normal seating position and both automobile doors are closed; but the seat is automatically unlatched whenever either door is opened so that the seat may be tilted forwardly as shown in Fig. 4, and access may be had to the rear seat compartment.

If desired, the solenoid 31 can be connected to be operated only by the door 13, and the solenoid 32 can be connected to be operated only by the door 14, or only a single solenoid can be used to move both bolts.

Figs. 7 and 8 show a modified form of the invention in which the catch member is pivotally mounted on the tilting seat back and is provided with a cam surface so that the catch may be cammed over the bolt when the seat is moved from its tilted position to its normal position in the event the bolt has moved to latching position while the seat back is tilted.

In Figs. 7 and 8 a catch support bracket 70 is bolted to the tilting seat back portion 24 and a catch member 72 is pivotally mounted on the bracket 70 by means of a pin 74. A spring 76 urges the catch 72 in a latching direction (clockwise as the parts appear in Fig. 7), and a pin 78 through the catch member acts as a stop to limit pivotal movement of the catch in a latching direction. The nose of the catch 72 is provided with a cam surface 77 so that in the event the bolt 38 is moved to latched position while the seat is tilted forward, the seat may be moved to its normal seating position and will automatically latch in this position, the catch 72 being cammed over the bolt by means of the cam surface 77. The underside of the catch is provided with a latching recess 80 for engaging the bolt.

In other respects the structure of Figs. 7 and 8 is similar to the structure of Figs. 2–5.

While I have shown and described two embodiments of my invention, it is capable of many modifications. Changes, therefore, in the construction and arrangement may be made without departing from the spirit and scope of the invention as set forth in the appended claims.

I claim:

1. In an automobile seat having a frame and a tilting seat back, latch means of the character described, including: a solenoid mounted on the frame, said solenoid having a horizontally movable retractable armature with a latch bolt projecting rigidly therefrom; a catch member pivotally mounted on the seat back, said catch member having a recess in one side for receiving said bolt and said catch member having a cam surface adjacent said recess and on the same side thereof adapted to engage the bolt when the seat is moved from tilted position whereby the bolt may cam the catch member to an out-of-the-way position so that the seat can be moved from tilted position regardless of the position of the bolt; a spring on said armature for moving said bolt into latching engagement with said catch when said solenoid is deenergized; door-operated switch means connected to said solenoid for energizing the solenoid for retracting said bolt when the door is open; and a pair of bolt support brackets on said frame having openings to receive the bolt, said brackets straddling the catch member between them and supporting the bolt when latched, any strain exerted on said bolt when the seat is latched being taken up by said support brackets.

2. Apparatus of the character claimed in claim 1, wherein said catch member has a stop portion engageable with a part of the seat back for limiting pivotal movement of the catch member in one direction and for retaining it in latching position.

3. In an automobile seat having a frame part and a tilting seat back part, latch means of the character described, including: a solenoid mounted on one of said seat parts, said solenoid having a movable armature with a latch bolt projecting therefrom; a catch member pivotally mounted on the other seat part, said catch member having a recess in one side for receiving said bolt and said catch member having a cam surface adjacent said recess on the same side thereof adapted to engage the bolt when the seat is moved from tilted position whereby the bolt may cam the catch member to an out-of-the-way position so that the seat can be moved from tilted position regardless of the position of the bolt; spring means for moving said bolt into latching engagement with said catch; and door operated switch means connected to said solenoid for energizing said solenoid to retract said bolt from said catch.

4. In an automobile seat having a frame and a tilting seat back, latch means of the character described, including: a solenoid mounted on the frame, said solenoid having a horizontally movable retractable armature with a latch bolt projecting rigidly therefrom; a catch member pivotally mounted on the seat back, said catch member having a recess in one side for receiving said bolt and said catch member having a cam surface adjacent said recess and on the same side thereof adapted to engage the bolt when the seat is moved from tilted position whereby the bolt may cam the catch member to an out-of-the-way position so that the seat can be moved from tilted position regardless of the position of the bolt; spring means biasing said catch toward latching position; stop means for maintaining said catch in latching position; spring means for moving said bolt into latching engagement with said catch when said solenoid is deenergized; door operated switch means connected to said solenoid for energizing the solenoid to retract said bolt when the door is open; and means on said frame for supporting the bolt when it is in latching engagement with said catch.

References Cited in the file of this patent

UNITED STATES PATENTS

| | | |
|---|---|---|
| 2,146,968 | Macagno | Feb. 14, 1939 |
| 2,149,695 | Wilhelm | Mar. 7, 1939 |
| 2,159,315 | Blue | May 23, 1939 |
| 2,624,613 | Parmely | Jan. 6, 1953 |

FOREIGN PATENTS

| | | |
|---|---|---|
| 174,156 | Great Britain | Jan. 16, 1922 |